March 8, 1960     H. F. JARGER     2,928,057
ELECTROMECHANICAL FILTER ARRANGEMENT
Filed Jan. 14, 1957     2 Sheets-Sheet 1

Inventor
HAROLD F. JARGER
By Bernard E. Franz
Attorney

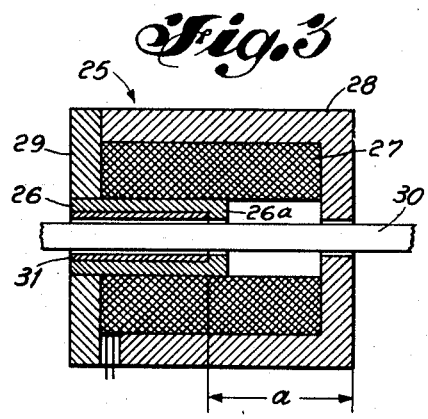
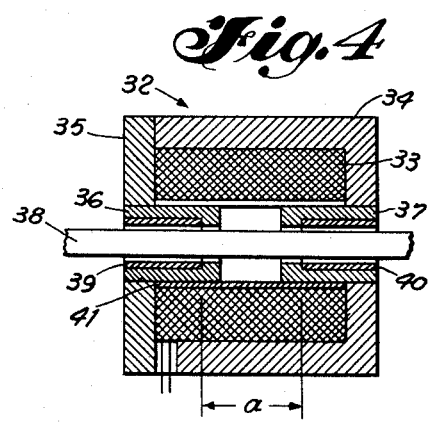
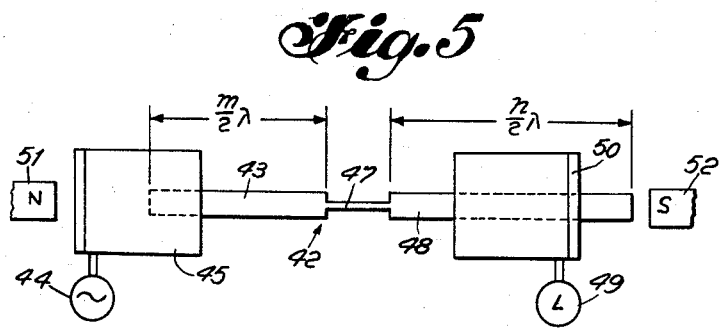
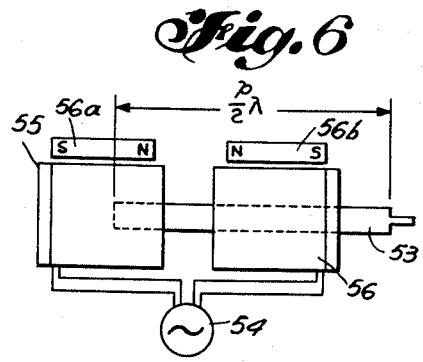
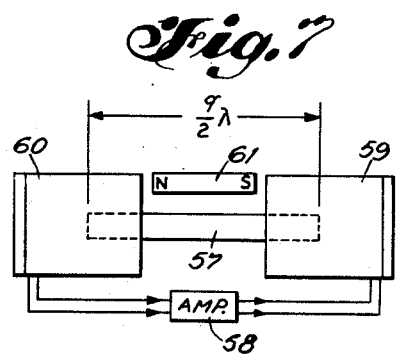
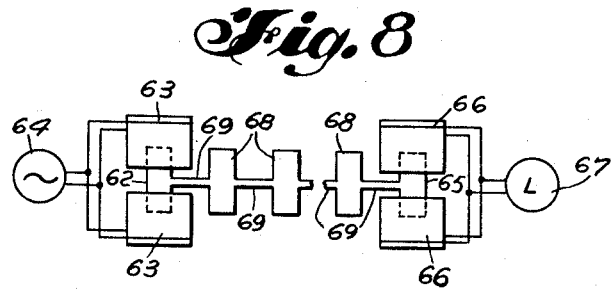

United States Patent Office 2,928,057
Patented Mar. 8, 1960

2,928,057

ELECTROMECHANICAL FILTER ARRANGEMENT

Harold F. Jarger, Rochelle Park, N.J., assignor to International Telephone and Telegraph Corporation, Nutley, N.J., a corporation of Maryland Application January 14, 1957, Serial No. 634,105

20 Claims. (Cl. 333—71)

This invention relates to an electromechanical transducing arrangement, and more particularly to drive and take-off arrangements for magnetostrictive resonators operating at high frequency.

Mechanical resonators have been found advantageous for use at low radio frequencies in filters and oscillators for example. For coupling to an electrical circuit for drive or take-off purposes a magnetostrictive resonator coupled magnetically to a surrounding coil is used. For optimum operation it is necessary that the coil be coupled to a half wavelength portion of the resonator, preferably near the center of the half wavelength portion, since maximum stress appears at the center of each half wavelength section and the force is in opposite directions in adjacent half wavelength sections. At high frequencies resonator elements become so short that it is difficult to obtain sufficient coupling. The resonator may be made a multiple of a half wavelength long so that a full half wavelength section may be used for the coil while the mounting or the mechanical coupling elements to other resonators may be connected at another half wavelength section. However, at still higher frequencies, approaching one megacycle, the axial length of the coils is severely limited, since it may be coupled to only one half wavelength, and the Q of the coils becomes too low for proper operation. Therefore successful operation of mechanical resonators has heretofore been limited to somewhat lower frequencies.

It is the principal object of this invention to provide an efficient arrangement of coupling drive and take-off coils to magnetostrictive resonators particularly at relatively high frequencies.

According to one aspect of the invention, operation at high frequency with coil assemblies having a length greater than a half wavelength is provided by using an arrangement for confining the magnetic path to a portion of the resonator shorter than the coil assembly. In the preferred form of the invention the coil is disposed axially about the resonator, a cup core is placed around the coil, and a slug is placed inside the coil to provide a magnetic path beyond the desired half wavelength portion of the resonator.

In one embodiment of the invention the excess portion of the coil extends beyond the end of the resonator. In another embodiment the slug is hollow for the resonator to extend through it and a shorted turn such as a metal sleeve is placed between the slug and the resonator to prevent the magnetic field from entering the resonator in that section. Two coils may be used on a single resonator to increase the drive or output.

Another object of the invention is to provide arrangement for minimizing electrical coupling between the input and output coils of a mechanical filter.

Capacitive coupling may be reduced by placing a split shield between each coil and the resonator. In my copending U.S. application for a Mechanical Coupling Utilizing Poisson's Effect, Serial No. 626,696, filed December 6, 1956, a toothed-H type filter structure is shown in which resonators are coupled by a neck connected laterally between the centers of the resonators, energized by the traverse oscillations due to Poisson's effect. In such a structure a shorted turn comprising a flat plate with the mechanical coupling neck extending through a hole therein may be used as a shield between the input and output resonators. In such a structure for high frequency use the resonators may be made a multiple of a half wavelength long, with the drive or take-off coils coupled to one half wavelength portion and the coupling neck connected to the center of another half wavelength portion to obtain more space for each.

According to another aspect of the invention, a mechanical filter of the toothed-H type has input and output resonators each three half wavelengths long with the coupling neck coupled laterally between the intermediate half wavelength sections respectively of the input and output resonators, and each resonator has two coils coupled to the respective end portions of the resonators for double drive or take-off. With this balanced arrangement the inductive coupling between the input and output resonators is canceled.

The above-mentioned and other features and objects of this invention will become more apparent by reference to the following description taken in conjunction with the accompanying drawings, in which:

Figs. 3 and 4 are sectional plan views of alternative embodiments of the arrangement for coupling a coil assembly to a resonator;

Fig. 5 is a diagrammatic view of a filter assembly incorporating the coupling arrangement of the invention;

Fig. 6 is a diagrammatic view of two coils coupled to a single resonator;

Fig. 7 is a diagrammatic view of an oscillator incorporating the coupling arrangement of the invention; and Fig. 8 is a diagrammatic view of a multisection filter with balanced drive and take-off coil arrangements.

Prior attempts to produce high frequency filters with mechanical resonators have shown that it is desirable to use coils of a size having a reasonable Q, and that there should be sufficient depth of penetration. Depth of penetration and therefore more nearly complete excitation may be obtained by using a flat strip with a thin cross section. This invention provides a structural arrangement which permits high frequency operation with proportionately large coils.

Figure 1:
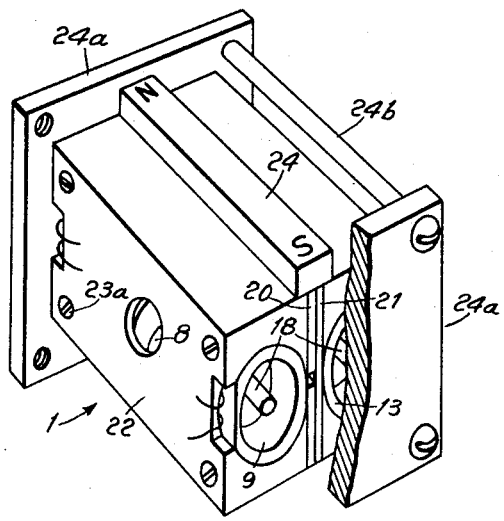
Fig. 1 is a perspective view of a filter assembly.
Figure 2:
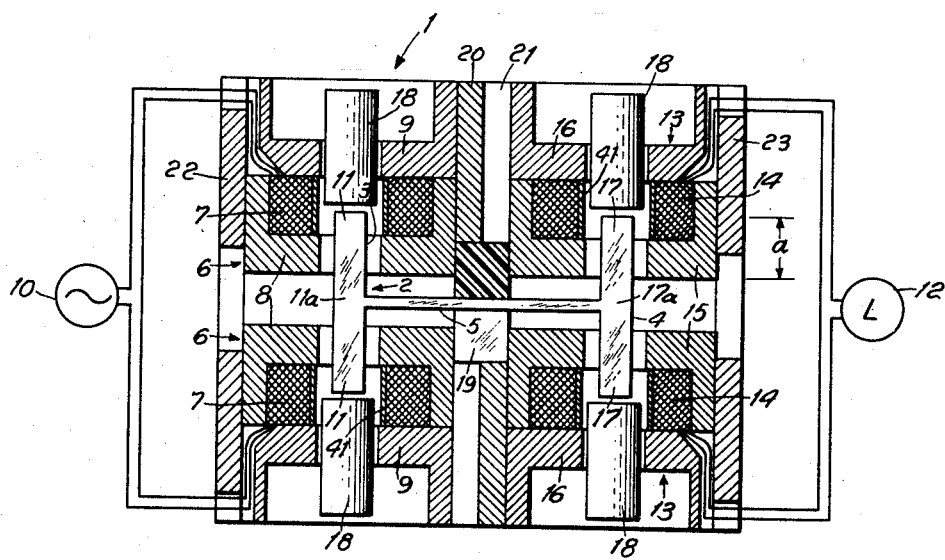
Fig. 2 is a sectional plan view with the end plates removed by the assembly shown in Fig. 1, connected to a signal source and a load device shown in block diagram.

The filter assembly 1 shown in Figs. 1 and 2 includes a mechanical filter 2 of the type in which a driven resonator 3 and a take-off resonator 4 are coupled by a neck 5 which is energized by the transverse oscillations in the resonators produced by Poisson's effect, as disclosed in my prior copending application. A double drive arrangement is used comprising two coil assemblies 6 each comprising a coil 7, a cup core 8 and a similar cup core 9 at the outer end. These coils are driven from a source 10. Each resonator is three half wavelengths long and the coils are coupled to respective end half wavelength portions 11, with the input so phased that the oscillations reinforce each other. The coupling neck 5 is connected to the center half wavelength portion 11a. Output to a load 12 from resonator 4 is obtained from sail assemblies 13 each comprising a coil 14, a cup core 15 and a similar cup core 16 at the outer end coupled to respective end half wavelength sections of 17 of resonator 4, with the resonator 4 driven by energy from neck 5 coupled to the center section 17a. It will be noted that the coil assemblies are coupled to a portion of each resonator of length $a$, preferably a half wavelength, even though the coil assembly has a longer axial length. The magnetic path is completed by a slug 18 inserted in the end of each coil assembly. The cores 8, 9, 15 and 16, and the slugs 18 may be made of powdered iron. The two drive coils and the two take-off coils are shown as connected in series but may be in parallel.

The filter is mounted by inserting the center of neck 5 in the slot of a section of polyethylene 19, which is in turn inserted in the slots of plates 20 and 21. Housings 22 and 23 are placed respectively against plates 20 and 21, with resonators 3 and 4 inside the respective housings, and the parts 20 and 23 are fastened together by bolts 23a. These housings and plates are made of non-magnetic material such as aluminum. The resonators are biased by a permanent magnet 24 mounted on top of the assembly. As shown in Fig. 1, the assembly is mounted between plates 24a held together by bolts 24b. These plates 24a are made of magnetic material such as steel to complete the biasing magnetic path.

The plates 20 and 21 together form a shorted turn around neck 5 to produce a magnetic field which counteracts any inductive coupling between the input coils 7 and the output coils 14. According to the invention, the need for this shorted turn is eliminated or reduced by the balanced drive and take-off arrangement. The two input coil assemblies 6 produce magnetic fields which cancel in neck 5. Any leakage flux reaching resonator 4 produces bucking voltages in the coils 14. However the shorted turn 20, 21 is still desirable to further reduce the inductive coupling.

By way of example a filter of the type shown in Fig. 1 in which each resonator is three half wavelengths long may be constructed from a sheet of "Ni-Span C" 0.011 inch thick with a resonator 0.533 inch long and 0.088 inch wide, and a coupling neck, 0.70 inch long and 0.020 inch wide, to provide a frequency pass band of 1.4 kilocycles with a center band frequency of 504 kilocycles.

The coil assembly may be coupled to an intermediate half wavelength portion of the resonator by the arrangements shown in Figs. 3 and 4. In the coil assembly 25 of Fig. 3 the slug 26 is hollow and the resonator extends through it. The coil assembly comprises a coil 27, a cup core 28 and a core end 29. It is desired to confine the portion of the magnetic path in the resonator 30 to the length $a$, which is preferably a half wavelength. Therefore a shorted turn such as a metal sleeve 31 is inserted inside the slug 26 to create a counter magnetic field which prevents the flow of magnetic flux between the slug 26 and the resonator 30, except at the end poles 26a of the slug.

In the coil assembly 32 shown in Fig. 4, which comprises a coil 33, a cup core 34 and a core end 35, the hollow slug is divided into two portions 36 and 37 to confine the magnetic field to the center of the coil assembly over the length $a$ (a half wavelength) of resonator 38. Metal sleeves 39 and 40 are inserted into the respective slugs to prevent flow of flux to undesired portions of the resonator.

To prevent leakage of flux between the pole ends of the slugs and the core, parallel to the desired section of the resonator, a split ring (not shown) may be placed on the end of the slug to create similar counter fields. Alternatively the ends of the slug may be tapered. The metal sleeves 31, 39 and 40, as well as any ring on the end of the slug, may be conductive material painted on the slug.

To reduce capacitive coupling between the coils and resonators a capacity shield 41 comprising a metalic split ring may be inserted inside the coil in any of the embodiments, as shown in Figs. 2 and 4. In addition the inside turns of the coils should be near ground potential.

In Fig. 5 a filter 41 is shown to illustrate some arrangements for using the invention. A resonator 43 is shown driven from a source 44 by means of a coil assembly 45, which is coupled to a half wavelength section of the resonator, and is similar to the coil assembly 6 shown in Fig. 1. The resonator is coupled longitudinally by neck 47 to resonator 48. Output to a load 49 is obtained by a coil assembly 50 which is coupled to an intermediate half wavelength portion of the resonator, and may be similar to either the coil assembly 25 shown in Fig. 3 or 32 shown in Fig. 4. The filter may be biased by an arrangement such as pole pieces 51 and 52 which are connected by an arrangement not shown. The resonator 42 is shown as being $m$ half wavelengths long while resonator 48 is $n$ wavelengths long. It should be understood that the input and output resonators would usually be similar with similar coupling arrangements, each being either end coupled or having a coil assembly coupled at an intermediate half wave portion.

Fig. 6 shows an arrangement in which a resonator 53 is coupled by two coil assemblies 55 and 56 of the types 6, 25 or 32 shown respectively in Figs. 1, 3 and 4, connected in common to a source 54. The coils may be connected in series or parallel. They are coupled to different half wavelength portions of the resonator, and so poled as to re-enforce the oscillations in the resonator 53. This resonator may be used in any filter of the well-known types. It is shown as being $p$ half wavelengths long. The coil assemblies 55 and 56 are shown as having individual bias magnets 56a and 56b respectively, which are shown as being oppositely poled, but which may be poled in the same direction, as long as the coils are properly poled accordingly.

Fig. 7 shows an arrangement in which a resonator 57 is used as a frequency determining element of an oscillator which includes an electrical amplifier 58. The output of the amplifier is coupled to the resonator by a coil assembly 59, and a coil assembly 60 couples the output of the resonator to the input of the amplifier. These coil assemblies are shown as being of the type shown at 6 in Fig. 1, but may be of the type shown in Figs. 3 or 4. Bias may be obtained by a permanent magnet 6 which is disposed parallel to the resonator. The resonator is shown as being $q$ half wavelengths long.

The toothed-H structure for a mechanical filter, with balanced drive and take-off coil assemblies shown in Figs. 1 and 2 may include additional intermediate resonators coupled by mechanical elements energized by the transverse oscillations due to Poisson's effect, as shown in Fig. 8. The filter comprises an input resonator with driving coil assemblies 63 supplied from a source 64; an output resonator 65 with take-off coils 66 connected to a load device 67, and intermediate resonators 68, coupled by necks 69. The two input coils 63 and the two output coils 66 are shown connected in parallel, but may be in series.

By way of example, a filter similar to that shown in Figs. 1 and 2, with nine resonators three half wavelengths long and a quarter wavelength wide, and coupling elements three quarter wavelengths long, constructed out of "Ni-Span C" sheet metal 0.010 inch thick with resonators 0.630 inch long by 0.105 inch wide, and coupling necks 0.315 inch long by 0.019 inch wide, provides a frequency pass band of 3 kilocycles with a center band frequency of 430 kilocycles.

In each of the embodiments shown the coil assemblies are greater than a half wavelength long, and the coil itself may be greater than a half wavelength long, but it is coupled to a portion of the resonator not substantially greater than a half wavelength long. It is desired that the principle coupling be at the center of a half wavelength portion and may include an entire half wavelength portion. Some coupling to the ends of adjacent half wavelength portions may be tolerated, as long as there is no coupling to the high stress portion of an adjacent half wavelength section.

I claim:

1. A transducing arrangement comprising a magnetostrictive resonator having a length greater than a half wavelength at the mean operating frequency, a coil through which alternating current is adapted to flow to provide a magnetic field, said coil having a physical length greater than a half-wavelength at the mean operating frequency, and a magnetic circuit including a portion of said resonator to confine the magnetic flux of said magnetic field to substantially a half wavelength portion of said resonator.

2. A transducing arrangement according to claim 1, wherein said coil is disposed coaxially of said resonator.

3. A transducing arrangement according to claim 2, wherein a portion of the said coil extends axially beyond the said portion of said resonator traversed by said magnetic field, and the said magnetic circuit includes a slug of magnetic material inside said extended portion of the coil.

4. A transducing arrangement according to claim 3, wherein the said extended portion of said coil and said slug are disposed axially beyond the end of said resonator.

5. A transducing arrangement according to claim 3, wherein the said slug is hollow, with the said resonator extending through said slug, and said magnetic circuit for confining said magnetic flux includes a shorted turn which is disposed between said resonator and said slug co-extensive with the axial portion of the said magnetic circuit which extends beyond the said half wavelength portion of said resonator.

6. A transducing arrangement according to claim 5, further including a second hollow slug and shorted turn at the end of said coil opposite from the first said slug.

7. An electromechanical filter including input and output transducing arrangements coupled to said resonator according to claim 1.

8. A transducing arrangement according to claim 1, wherein said resonator has a length greater than two half wavelengths at the mean operating frequency, said coil being coupled to one half wavelength, and a second coil similarly coupled to another half wavelength.

9. A transducing arrangement according to claim 8, wherein said resonator has a major oscillation in the longitudinal mode and an accompanying transverse oscillation due to Poisson's effect, said resonator including a half wavelength portion intermediate the portions to which said coils are coupled, and mechanical means energized by said transverse oscillations for coupling said intermediate portion to another mechanical resonator.

10. A transducing arrangement according to claim 8, wherein said coils are coupled in common to a source of A.C. signals so phased as to be aiding in driving said resonator at said frequency.

11. A transducing arrangement according to claim 10, wherein said coils are connected in series.

12. A transducing arrangement according to claim 10, wherein said coils are connected in parallel.

13. An oscillator including a transducing arrangement according to claim 8, and electrical amplifying means connected between said coils.

14. A transducing arrangement comprising a magnetostrictive resonator having a length greater than a half wavelength at the mean operating frequency, a coil assembly disposed coaxially of said resonator, comprising a coil and a magnetic core disposed about the outside and the ends of said coil, said coil having a physical length greater than a half-wavelength at the mean operating frequency, said coil assembly having an overall axial magnetic path exceeding a half wavelength, and magnetic means including the cooperative relation of said core and a portion of said resonator to confine the field of said coil to substantially a half wavelength portion of said resonator.

15. A transducing arrangement comprising a magnetostrictive resonator having a length of at least three half wavelengths at the mean operating frequency, two coils coupled to respective half wavelength portions of said resonator which are separated by at least one intermediate half wavelength portion, said coils having a physical length greater than a half-wavelength at the mean operating frequency means for connecting said coils in common to an electrical device so that their electrical current flow and magnetic fields are aiding with respect to oscillations in said resonator at said frequency, and mechanical means for coupling oscillations in said resonator to another mechanical resonator.

16. A transducing arrangement according to claim 15, wherein said resonator has, when excited, a major oscillation in the longitudinal mode and accompanying transverse oscillation due to Poisson's effect, and said mechanical coupling means is coupled to said intermediate portion and energized by said transverse oscillations.

17. An electromechanical filter including input and output magnetostrictive resonators, each at least three half wavelengths long at the mean operating frequency, each having, when excited, a major oscillation in the longitudinal mode and an accompanying transverse oscillation due to Poisson's effect, each said resonator having two coils coupled to respective half wavelength portions which are separated by at least one intermediate half wavelength portion, said coils having a physical length greater than a half-wavelength at the mean operating frequency, mechanical means energized by said transverse oscillations coupling said intermediate portion of said input resonator to said intermediate portion of said output resonator, means for connecting said coils of said input resonator in common to a source of A.C. input signals so phased as to be aiding in driving said input resonator at said frequency, and means for connecting said coils of said output resonator in common to deliver A.C. output signals in phase at said frequency to a load device.

18. An electromechanical filter according to claim 17, further including additional mechanical resonators coupled between said input and output resonators.

19. An electromechanical filter according to claim 17, further including a shorted turn disposed around said mechanical coupling means and between said input and output resonators.

20. An electromechanical filter according to claim 19, wherein said shorted turn comprises two slotted metal plates with said mechanical coupling means inserted in said slots, said slots extending in different directions from said mechanical coupling means with electrical contact between said plates so that they form a complete turn.

References Cited in the file of this patent

UNITED STATES PATENTS

| | | |
|---|---|---|
| 2,407,243 | Batchelder | Sept. 10, 1946 |
| 2,455,740 | Curtis | Dec. 7, 1948 |
| 2,596,226 | Eldridge | May 13, 1952 |
| 2,607,814 | Bloch | Aug. 19, 1952 |
| 2,652,542 | Anthony et al. | Sept. 15, 1953 |
| 2,709,243 | Babcock | May 24, 1955 |
| 2,738,467 | Roberts | Mar. 13, 1956 |
| 2,806,328 | Bradfield | Sept. 17, 1957 |